(12) United States Patent
Helsley et al.

(10) Patent No.: US 9,477,696 B2
(45) Date of Patent: Oct. 25, 2016

(54) SERIALIZING RESOURCE UTILIZATION USING HARDWARE BUILT-IN FUNCTIONS

(71) Applicants: David Helsley, Glastonbury, CT (US); Lawrence Lee, Chino Hills, CA (US)

(72) Inventors: David Helsley, Glastonbury, CT (US); Lawrence Lee, Chino Hills, CA (US)

(73) Assignee: CA, Inc., New York, NY (US)

( * ) Notice: Subject to any disclaimer, the term of this patent is extended or adjusted under 35 U.S.C. 154(b) by 373 days.

(21) Appl. No.: 14/206,467

(22) Filed: Mar. 12, 2014

(65) Prior Publication Data

US 2015/0261790 A1 Sep. 17, 2015

(51) Int. Cl.
*G06F 17/30* (2006.01)

(52) U.S. Cl.
CPC ... *G06F 17/30289* (2013.01); *G06F 17/30345* (2013.01)

(58) Field of Classification Search
CPC .................... G06F 17/30289; G06F 17/30345
USPC ........................................ 707/803, 802, 800
See application file for complete search history.

(56) References Cited

U.S. PATENT DOCUMENTS

| | | | | |
|---|---|---|---|---|
| 6,128,710 A | * | 10/2000 | Greenspan | G06F 9/526 711/150 |
| 2011/0082962 A1 | * | 4/2011 | Horovitz | G06F 11/301 711/6 |
| 2011/0145827 A1 | * | 6/2011 | Song | G06F 7/78 718/102 |

* cited by examiner

*Primary Examiner* — Thu-Nguyet Le
(74) *Attorney, Agent, or Firm* — Baker Botts L.L.P.

(57) ABSTRACT

A method includes identifying a first value of a lock word corresponding to a data structure, by a process in a plurality of processes that each have access to the data structure. The method also includes copying the data structure to a corresponding shadow record. The method additionally includes modifying the shadow record with a desired update for the data structure, and atomically updating the data structure and the lock word, by the process, using a hardware built-in function. The updating includes identifying a second value of the lock word and determining whether the first value of the lock word and the second value of the lock word are equivalent. The method additionally includes, in response to determining that the first value of the lock word and the second value of the lock word are equivalent, replacing the data structure with the shadow record and incrementing the lock word.

20 Claims, 3 Drawing Sheets

US 9,477,696 B2

SERIALIZING RESOURCE UTILIZATION USING HARDWARE BUILT-IN FUNCTIONS

BACKGROUND

The disclosure relates generally to resource utilization, and specifically to serializing resource utilization using hardware built-in functions.

SUMMARY

According to one embodiment of the disclosure, a method includes identifying a first value of a lock word corresponding to a data structure, by a process in a plurality of processes that each have access to the data structure. The method also includes copying the data structure to a corresponding shadow record. The method additionally includes modifying the shadow record with a desired update for the data structure, and atomically updating the data structure and the lock word, by the process, using a hardware built-in function. The updating includes identifying a second value of the lock word and determining whether the first value of the lock word and the second value of the lock word are equivalent. The method additionally includes, in response to determining that the first value of the lock word and the second value of the lock word are equivalent, replacing the data structure with the shadow record and incrementing the lock word.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
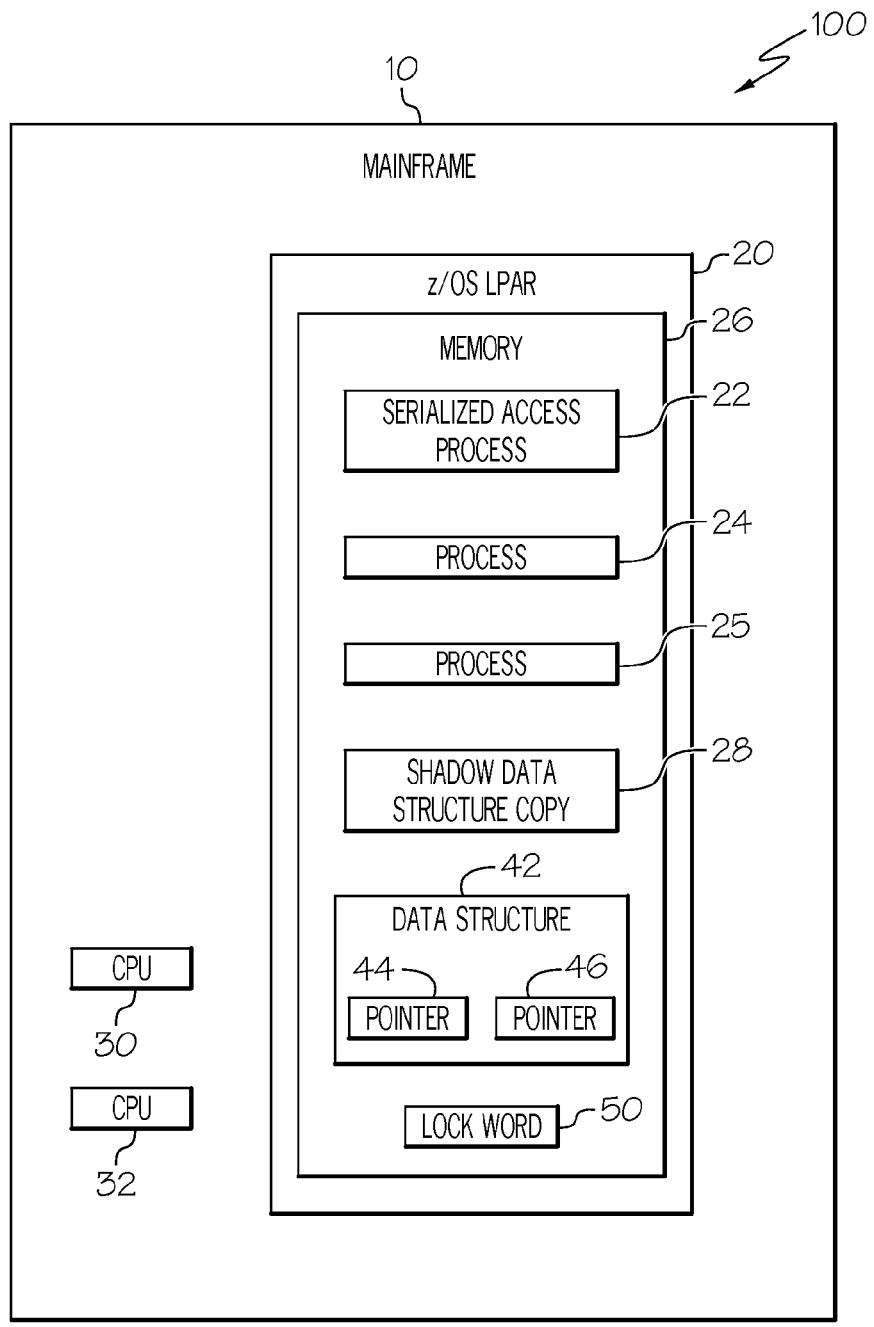
FIG. 1 illustrates a block diagram of a system for serializing resource utilization using hardware built-in functions in accordance with a particular non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®. EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

z/OS systems host and manage complex business applications that may concurrently run on one or more mainframe systems. These applications often compete for use of system hardware and data resources. For example, concurrently running processes may require concurrent access to CPU time. z/OS Workload Manager can schedule CPU time for the concurrent processes on one or more CPU resources. As another example, concurrently running processes may request access to and/or make edits to the same protected memory space, linked list, or other data structure stored in shared system memory. Coordinating these edits may be problematic if memory access is not scheduled appropriately.

In certain embodiments, the teachings of the present disclosure may enable processes to perform serialized updates to data structures stored on z/OS systems. Data structures may also be chained together in a serialized manner, such that concurrent processes may access the data in a protected manner. In certain embodiments, a concurrently accessible and/or editable linked-list data structure may be implemented on z/OS systems to provide concurrent processes access to essential data regardless of attributes of the calling process.

Referring to FIG. 1, a block diagram of a system 100 for serializing resource utilization using hardware built-in functions is illustrated in accordance with a particular non-limiting embodiment of the present disclosure. System 100 includes mainframe 10 running a z/OS logical partition ("LPAR") 20. z/OS LPAR 20 includes memory 26 containing processes 24 and 25 and shadow data structure copy 28. z/OS LPAR 20 also includes serialized access process 22 which controls access safety for data structure 42 in memory 26. Mainframe 10 also includes CPU's 30 and 32.

In certain embodiments, processes 24 and 25 concurrently request access to data structure 42 in memory 26. Process 24 requests editing access to data structure 42 through serialized access process 22. Serialized access process 22 checks the value of lock word 50 stored in memory 26, stores the value of lock word 50 in memory 26, and creates shadow data structure copy 28 of data structure 42 in memory 26. Process 24 makes updates to shadow data structure copy 28, and uses serialized access process 22 to push the updates to data structure 42 in memory 26. Serialized access process 22 initializes a compare swap and triple store hardware built-in instruction. In certain embodiments, this instruction may be a perform lock operation ("PLO") instruction. The instruction is initialized such that the compare takes place on lock word 50. The value serialized access process 22 stored for lock word 50 is compared with the current value of lock word 50. The instruction is further initialized such that the triple store stores the updated values of each of pointer 44 and 46 with the updated pointers from shadow data structure copy 28. The instruction is additionally initialized such that lock word 50 is incremented. The compare swap and triple store instruction is executed. The instruction may be executed atomically. A return value is checked to determine whether the instruction executed successfully. In certain embodiments, the instruction may execute successfully, and process 24 may continue execution.

In certain embodiments, the PLO instruction may not execute successfully because, for example, the compare step of the compare swap and triple store instruction may have failed. For example, the compare step may have determined that the value of lock word 50 stored by serialized access process 22 was not equal to the current value of lock word 50. In this example, the instruction may return a code indicating that the instruction was not successfully executed.

In certain embodiments, the compare swap and triple store instruction may execute atomically. For example, the instruction may not make any edits to memory 26 if an error was encountered in one of the steps of the instruction. If the compare step of the compare swap and triple store instruction failed, no values initialized in the triple store initialization step may be stored.

In certain embodiments, if the instruction is not executed successfully, serialized access process 22 may restart the update process again.

In certain embodiments, serialized access process 22 may contain code that reads and stores a specialized data structure in memory 26. For example, the specialized data structure may be a linked list data structure. Serialized access capabilities may be wrapped around linked list data structure code.

The linked list data structure code may include a linked list node that includes previous node pointer 44 and next node pointer 46. Each of these pointers may reside in 32 bit memory address spaces and may point to other data structure 42 nodes. In 64 bit systems, previous node pointer 44 and next node pointer 46 may require 64 bits of memory space in order to address memory 26 memory spaces for other data structure 42 nodes.

In certain embodiments, a compare swap and triple store hardware built-in function may atomically update previous node pointer 44 and next node pointer 46 of linked list nodes on 32 bit systems. Corresponding functionality may be also supported on 64 bit systems.

In certain embodiments, hardware built-in functions may provide access to general purpose instructions. Hardware built-in functions may instruct the compiler to generate a hardware instruction. For example, using hardware built-in functions in Metal C may result in generation of a hardware instruction by the compiler. Hardware built-in functions may include the PLO instruction.

In certain embodiments, a PLO instruction includes a hardware instruction configured to perform atomic operations. For example, a PLO instruction may perform a compare and load; compare and swap; double compare and swap; compare swap and store; compare swap and double store; and/or a compare swap and triple store. In certain embodiments, various PLO instructions may be utilized without departing from the scope of the present disclosure.

In certain embodiments, the PLO instruction requires an address to a lock, a function code that specifies the operation to be performed, and the relevant operands. For example, the PLO instruction may be initialized with the address of a lock word, a function code specifying that the compare swap and triple store operation is to be performed, and the relevant values to store.

Figure 2:
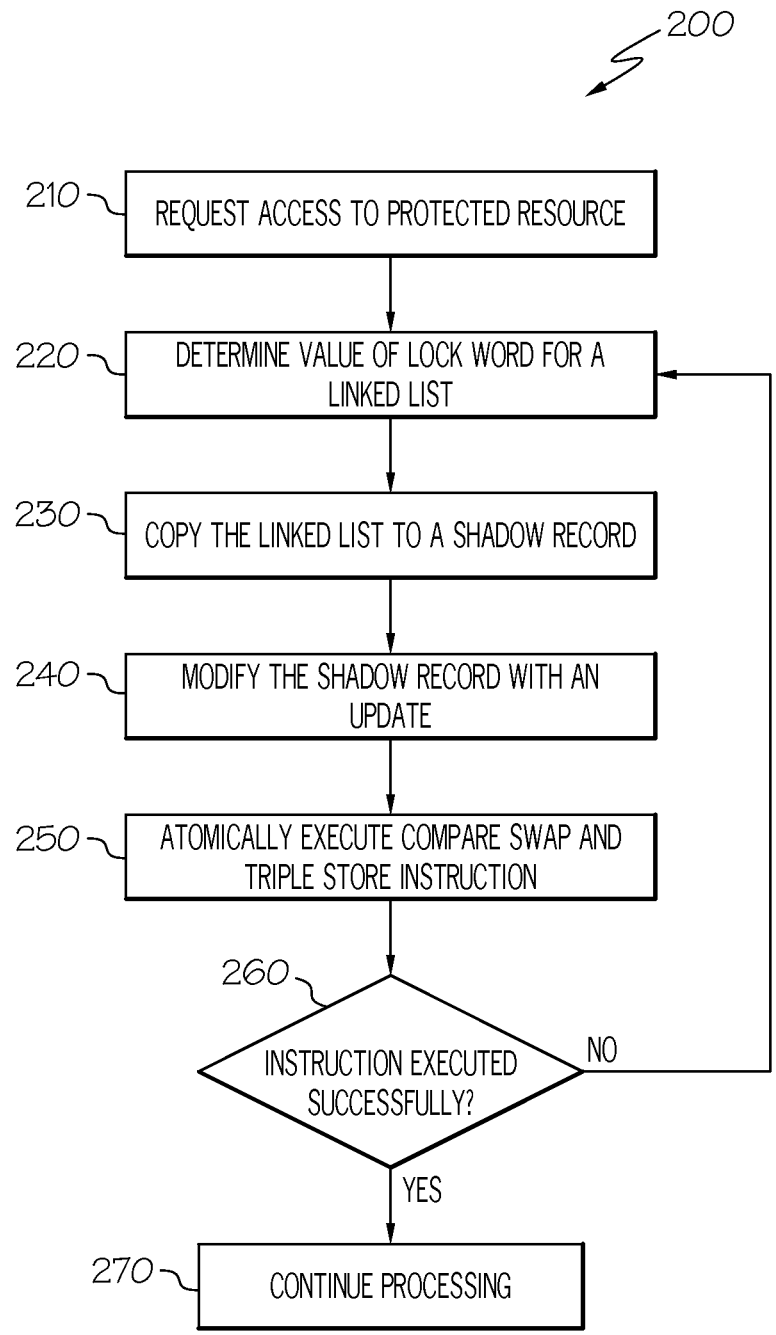
FIG. 2 illustrates a flowchart of a method for serializing resource utilization using hardware built-in functions in accordance with a particular non-limiting embodiment of the present disclosure.

Referring to FIG. 2, a flowchart 200 of a method for serializing resource utilization using hardware built-in functions is illustrated in accordance with a particular non-limiting embodiment of the present disclosure. At step 210, access to a protected resource is requested by a process. For example, process 24 from system 100 requests access to a commonly accessible linked list data structure stored in memory.

At step 220, the value of a lock word corresponding to the linked list is determined. In certain embodiments, a serialized access process checks the value of the lock word and performs editing operations in a concurrent process safe manner. For example, process 24 from system 100 may call a function on serialized access process 22 designed to safely update data structures. Serialized access process may provide a host of functions tailored to editing data structures. For example, serialized access process 22 may provide for operations such as list add, list tail, add tail, delete init, various ways to walk the list, and/or other functions appropriate for the applicable data structure being accessed. Each of these functions may be implemented in a concurrent process safe manner.

In certain embodiments, serialized access process 22 monitors lock words for many data structures. When process 24 calls an editing function provided by serialized access process 22, serialized access process 22 determines where a lock word corresponding to the data structure being edited is stored and determines the value of the lock word.

At step 230, the linked list is copied to a shadow record. For example, serialized access process 22 copies a linked list data structure to a shadow record in memory 26. As another example, serialized access process 22 copies a node from the linked list data structure to a shadow record.

At step 240, serialized access process 22 modifies the shadow record of the data structure with updates. A compare swap and triple store instruction may be initialized with the updated shadow record data and an incremented value of the lock word.

At step 250, the compare swap and triple store instruction may be executed and/or dispatched. The instruction may compare the stored value of the lock word with the current value of the lock word. If the lock word equals the stored value of the lock word, then the three store operations may execute. If the lock word is not equal to the stored value of the lock word, then an error code may be returned from execution of the instruction. The error code may signify that no edits to the lock word or the resource were made.

In certain embodiments, execution of this instruction may be atomic, i.e., the instruction may only execute either all operations successfully or none at all.

At step 260, a return code of the compare swap and triple store PLO instruction may indicate that the instruction executed successfully. In other embodiments, a return code may indicate a failure. This may indicate that another process may have been scheduled on the CPU to execute modifications to the resource while the shadow record copy and editing was being performed. In this example, processing is reverted back to step 220, where the value of the lock word is determined and stored. Execution continues down this path until the value of the lock word determined before copying the data structure to the shadow record equals the value of the lock word during the atomic store operation.

In certain embodiments, one or more other processes may carry out the functions described in accordance with serialized access process 22 above. Further, this functionality should not be limited to running in a separate process. Features and aspects of the functionality and/or the entire functionality of serialized access process 22 may be contained in any calling processes.

In certain embodiments, processing may loop around flowchart 200 until the PLO instruction is successfully executed and returns the success code. In certain embodiments, a timeout or loop count may be reached in which the function executing the instruction may return an error back to the main processing thread. This may be achieved in source code by using a while, do while, for, or other such conditional loop in which each step of flowchart 200 is executed repeated until a certain timeout threshold is reached, or the PLO instruction is successfully executed.

In certain embodiments, flowchart 200 may be implemented in data structure code, i.e., the steps in flowchart 200 may be wrapped in editing functions or methods exposed by the data structure. For example, a concurrent-use safe linked list structure may have a variety of editing functions exposed. An add_tail function may enable callers to add a node to the tail of the linked list. The add_tail function code may perform the steps of flowchart 200 in order to ensure that all access to the linked list is performed in a concurrent-use safe manner.

Figure 3:
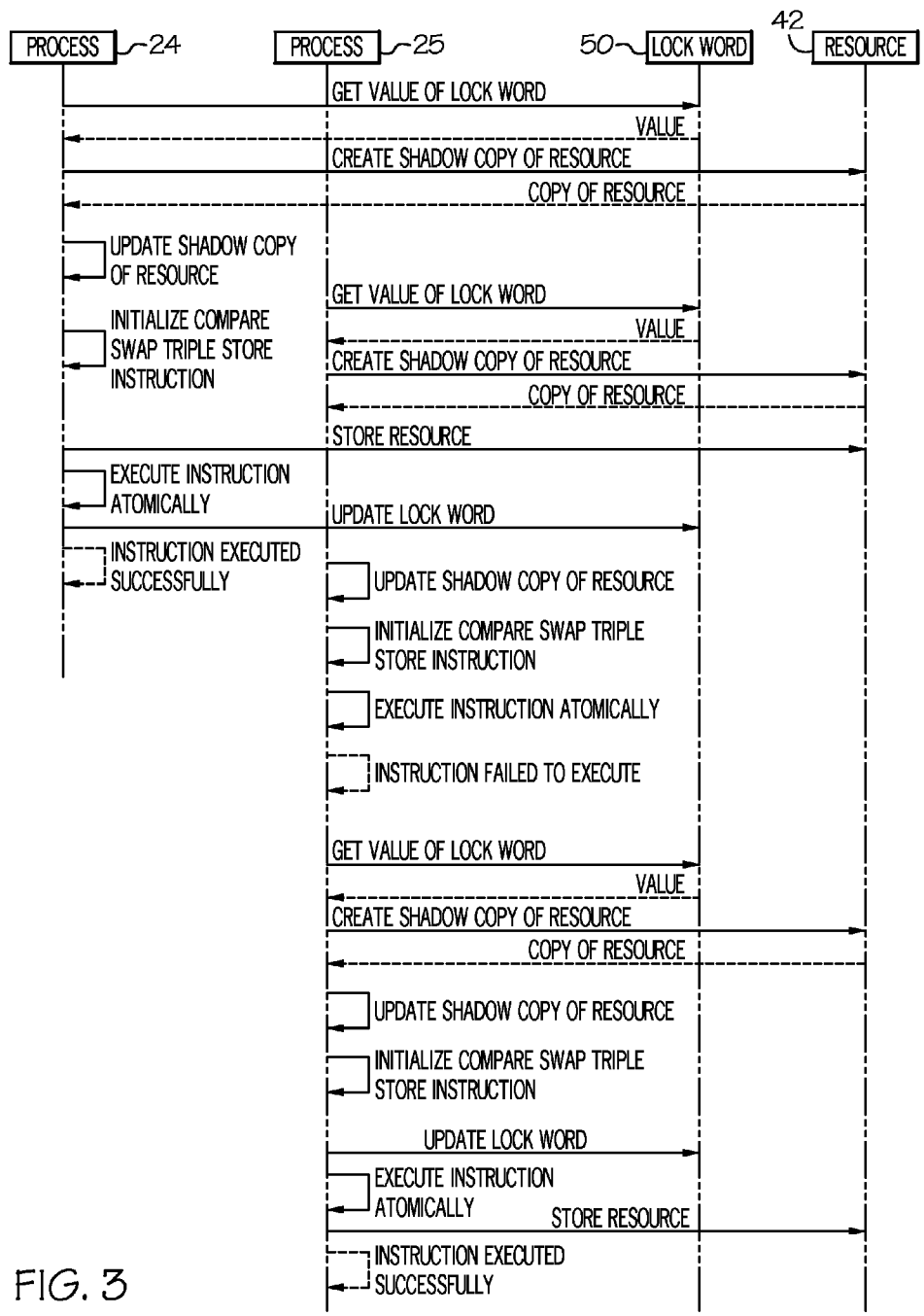
FIG. 3 illustrates a sequence diagram of two concurrently running processes in a system for serializing resource utilization using hardware built-in functions in accordance with a particular non-limiting embodiment of the present disclosure.

Referring to FIG. 3, a sequence diagram of two concurrently running processes is illustrated in a system for serializing resource utilization using hardware built-in functions in accordance with a particular non-limiting embodiment of the present disclosure. The sequence diagram shows processes 24 and 25, as well as lock word 50 and resource 42 (i.e., data structure 42) from system 100. The sequence diagram illustrates an example workflow for two processes attempting to edit resource 42 concurrently.

In certain embodiments, z/OS systems may employ one or more of several techniques for protecting data integrity for shared resources. Keyed storage protection may be one such technique that complicates system-wide locking systems. For example, using keyed storage protection, a control key in each storage frame is used to denote the level of protection the memory space is afforded. When concurrent processes attempt to access a single data structure in memory, the key associated with the request is compared to the control key for the storage frame. If the key associated with the request does not match the storage key, the system may reject the request and issue a program exception interrupt.

However, the keyed storage protection system may not satisfy certain concurrent access protection problems for z/OS systems. For example, if a program running in a high key (e.g., user key 9 state), access will be denied to the memory space regardless of whether another process is concurrently accessing the data structure.

In certain embodiments, the serialized list structure may provide list add, list tail, add tail, and various methods for walking the list. These structures may be placed in existing code. The structure may have a next and previous pointer. The structure may further be able to tell where the structure starts and ends based on the next and previous pointers.

Various data structures used on other operating systems such as, for example, Linux, may be coded and/or adapted into z/OS systems. However, these adapted structures may not have any locking or serialization functionality. For example, a process may have a reference to one node in the data structure, but when the process updates that data structure the pointer may be referencing a different node in the data structure. Further, other operating systems may provide more robust data structure access serialization libraries that are not available on z/OS.

In certain embodiments, Metal C and/or other C based languages may be used to create data structures that provide for serialized access and concurrent use. These programs may have access to only limited and high level locking mechanisms in the z/OS environment. Thus, the teachings of the present disclosure may enable those of ordinary skill in the art to provide flexible locking mechanisms and corresponding data structures in the z/OS environment, without using dangerous high level system locks that may jeopardize system stability.

In certain embodiments, z/OS systems may provide an enqueue macro and a dequeue macro. However, the enqueue macro may require an svc instruction in order to obtain control of the resource. This may be problematic because the svc instruction may not be executed by code that is running in service request blocks. Additionally, the svc instruction may not be used by code that is running in a disabled state.

As another example, z/OS systems may provide latching mechanisms. However, disabled callers may not be able to use latching mechanisms.

As yet another example, z/OS systems may provide spin-lock mechanisms. However, such mechanisms may not provide sufficient granularity to enable use in this context.

As still another example, z/OS systems may provide cross memory lock mechanisms. However, these mechanisms may not be effective on concurrent systems running in multiple address spaces.

As another example, z/OS systems may provide a CPU lock mechanism. But this mechanism may not be effective for processes running on multiple CPU's.

High level locks such as real storage manager spin lock may harm machine performance. Virtual storage management additionally provides locks. However, these locks are generally off-limits to calling processes because the stability of the machine may be jeopardized in obtaining or applying these locks.

In certain embodiments, the teachings of the present disclosure may use a PLO instruction to perform serialization of an incrementing lock word value. A lock word stored in memory is incremented every time data structure is updated. Perform lock operations may allow other updates to be made autonomously with respect to other callers.

In certain embodiments, the PLO instruction performs a compare and swap on the lock word with a triple store. For example, 32 bit pointers may be used to represent next and previous pointers. The PLO instruction may update these pointers with the triple store operations. Thus, a 64 bit address/value for the node may be updated.

In certain embodiments, larger data structures with larger storage addresses, such as 128 bit storage addresses, may be implemented using the same systems and methods described above.

The PLO instruction may be used on a variety of concurrent key storage protection state processes. For example, a key 8 problem state user is generally a protected state user (e.g., such users may only update key 8 storage). Alternatively, key 0 processes may update storage regardless of the corresponding memory key level. The PLO instruction may enable serialized access to resources for processes running in each of these key states, as well as other key states such as user specific key states (e.g., key 9 users, key 10 users, etc.). Thus, a data structure may be serialized whether the process is a disabled caller or a key 8 problem state caller.

In certain embodiments, the data structure may correspond to a linked list. The linked list may be programmed using Metal C, C, Java, or any other programming language available on z/OS. In certain embodiments, the data structure may be a dictionary, hash, or any other data structure configured for serialized access on z/OS systems.

In certain embodiments, these data structures may simulate data structures available on other environments, such as Linux on system Z. Thus, the teachings of the present disclosure may enable data transfer and/or interoperability with other operating systems. For example, data may be transferred from a Linux on system Z partition to a z/OS system, and may be stored in a concurrent-use safe data structure on the z/OS system that corresponds to the data structure on the host (i.e., Linux on system Z) system.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
identifying a first value of a lock word corresponding to a data structure, by a process in a plurality of processes that each have access to the data structure;
copying the data structure to a corresponding shadow record;
modifying the corresponding shadow record with a desired update for the data structure; and
atomically updating the data structure and the lock word, by the process, using a hardware built-in function, the updating comprising:
identifying a second value of the lock word;
determining whether the first value of the lock word and the second value of the lock word are equivalent;
in response to determining that the first value of the lock word and the second value of the lock word are equivalent, replacing the data structure with the modified corresponding shadow record; and
incrementing the lock word.

2. The method of claim 1, wherein the hardware built-in function is configured to atomically store three values based on the outcome of a comparison; and wherein the three values correspond to a first pointer in the data structure, a second pointer in the data structure, and the lock word respectively.

3. The method of claim 1, wherein the updating the data structure further comprises:
in response to determining that the first value of the lock word and the second value of the lock word are not equivalent, copying the data structure to a second corresponding shadow record;
modifying the second corresponding shadow record with the desired update for the data structure;
identifying a third value of the lock word; and
determining whether the second value of the lock word and the third value of the lock word are equivalent.

4. The method of claim 1, wherein the hardware built-in function comprises a perform lock operation ("PLO") compare swap and triple store instruction in a z/OS system.

5. The method of claim 4, wherein atomically updating the data structure and the lock word further comprise:
initializing the PLO instruction with:
the first value of the lock word;
an incremented value of the lock word;
a first pointer in the shadow record; and
a second pointer in the shadow record; and
executing the PLO instruction.

6. The method of claim 1, wherein the data structure is stored in a first memory block having a first control key indicative of a high-protection state, and the process runs in a second memory block having a second control key state indicative of a low-protection state.

7. The method of claim 5, wherein the PLO instruction returns a result code upon execution, the result code indicating success of the PLO instruction upon execution.

8. A computer configured to access a storage device, the computer comprising:
a processor; and
a non-transitory, computer-readable storage medium storing computer-readable instructions that when executed by the processor cause the computer to perform:
identifying a first value of a lock word corresponding to a data structure, by a process in a plurality of processes that each have access to the data structure;
copying the data structure to a corresponding shadow record;
modifying the corresponding shadow record with a desired update for the data structure; and
atomically updating the data structure and the lock word, by the process, using a hardware built-in function, the updating comprising:
identifying a second value of the lock word;
determining whether the first value of the lock word and the second value of the lock word are equivalent;
in response to determining that the first value of the lock word and the second value of the lock word are equivalent, replacing the data structure with the modified corresponding shadow record; and
incrementing the lock word.

9. The computer of claim 8, wherein the hardware built-in function is configured to atomically store three values based on the outcome of a comparison; and wherein the three values correspond to a first pointer in the data structure, a second pointer in the data structure, and the lock word respectively.

10. The computer of claim 8, wherein the updating the data structure further comprises:
in response to determining that the first value of the lock word and the second value of the lock word are not equivalent, copying the data structure to a second corresponding shadow record;
modifying the second corresponding shadow record with the desired update for the data structure;
identifying a third value of the lock word; and
determining whether the second value of the lock word and the third value of the lock word are equivalent.

11. The computer of claim 8, wherein the hardware built-in function comprises a perform lock operation ("PLO") compare swap and triple store instruction in a z/OS system.

12. The computer of claim 11, wherein atomically updating the data structure and the lock word further comprise:
initializing the PLO instruction with:
the first value of the lock word;
an incremented value of the lock word;
a first pointer in the shadow record; and
a second pointer in the shadow record; and
executing the PLO instruction.

13. The computer of claim 8, wherein the data structure is stored in a first memory block having a first control key indicative of a high-protection state, and the process runs in a second memory block having a second control key state indicative of a low-protection state.

14. The computer of claim 12, wherein the PLO instruction returns a result code upon execution, the result code indicating success of the PLO instruction upon execution.

15. A computer program product comprising:
a computer-readable storage medium having computer-readable program code embodied therewith, the computer-readable program code comprising:
computer-readable program code configured to identify a first value of a lock word corresponding to a data structure, by a process in a plurality of processes that each have access to the data structure;
computer-readable program code configured to copy the data structure to a corresponding shadow record;
computer-readable program code configured to modify the corresponding shadow record with a desired update for the data structure; and computer-readable program code configured to atomically update the data structure and the lock word, by the process, using a hardware built-in function, the updating comprising:
identifying a second value of the lock word;
determining whether the first value of the lock word and the second value of the lock word are equivalent;
in response to determining that the first value of the lock word and the second value of the lock word are equivalent, replacing the data structure with the modified corresponding shadow record; and
incrementing the lock word.

16. The computer program product of claim 15, wherein the hardware built-in function is configured to atomically store three values based on the outcome of a comparison; and wherein the three values correspond to a first pointer in the data structure, a second pointer in the data structure, and the lock word respectively.

17. The computer program product of claim 15, wherein the updating the data structure further comprises:
in response to determining that the first value of the lock word and the second value of the lock word are not equivalent, copying the data structure to a second corresponding shadow record;
modifying the second corresponding shadow record with the desired update for the data structure;
identifying a third value of the lock word; and
determining whether the second value of the lock word and the third value of the lock word are equivalent.

18. The computer program product of claim 15, wherein the hardware built-in function comprises a perform lock operation ("PLO") compare swap and triple store instruction in a z/OS system.

19. The computer program product of claim 18, wherein atomically updating the data structure and the lock word further comprise:
initializing the PLO instruction with:
the first value of the lock word;
an incremented value of the lock word;
a first pointer in the shadow record; and
a second pointer in the shadow record; and
executing the PLO instruction.

20. The computer program product of claim 15, wherein the data structure is stored in a first memory block having a first control key indicative of a high-protection state, and the process runs in a second memory block having a second control key state indicative of a low-protection state.

* * * * *